Sept. 12, 1944.  W. S. MASON  2,358,239

PISTON RING SPACER AND EXPANDER

Filed Feb. 24, 1942

Inventor:

William S. Mason

Patented Sept. 12, 1944

2,358,239

UNITED STATES PATENT OFFICE 2,358,239

PISTON RING SPACER AND EXPANDER

William S. Mason, Memphis, Tenn.

Application February 24, 1942, Serial No. 432,146

8 Claims. (Cl. 309—45)

This invention relates to packing rings and more particularly to piston rings applicable for use in the cylinders of internal combustion engines.

One object of my invention is to provide an improved packing in which the spacer ring and the piston rings expand and contract as a unit, and the spacer ring provides free oil drainage between the wall of the cylinder and the drain ducts in the bottom of the groove in the piston.

Another object is to provide a spacer ring which will substantially prevent the piston rings from twisting within the groove, also from reciprocating excessively therein, and permitting an excessive amount of oil to pass between the piston rings and the side walls of the groove in the piston at high engine speeds.

Other objects and advantages will be brought out in the following description and claims, where in they will be more readily apparent when read in conjunction with the accompanying drawing in which:

Figure 1:
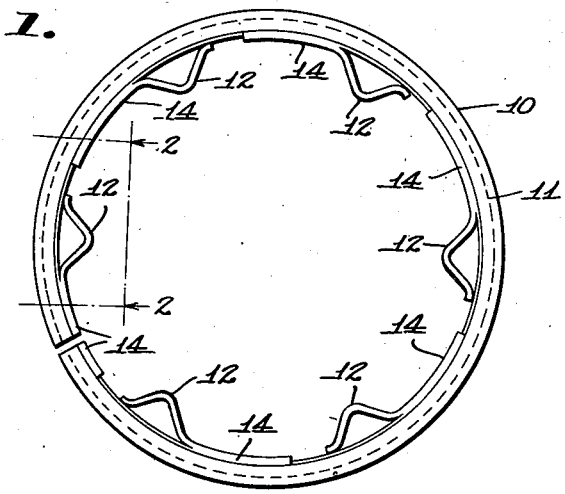
Figure 1 is a top view of a packing constructed according to the present invention.

In the packing shown in Figure 1, the spacer ring consists of annular band 10 provided with radially expanding arms 15, which are corrugated or crimped to prevent the piston rings 11 from twisting or reciprocating within the groove at high engine speeds. The corrugated portions of the arms also provide a seat for both the free and connected ends of the spring fingers 12. The band has its upper and lower edges doubled upon itself to provide beading 14, which engages the inner periphery of the piston rings and transmits the radial pressure exerted by the spacer and the spring fingers to the piston rings providing, or supplementing, their radial expansibility.

Figure 2:
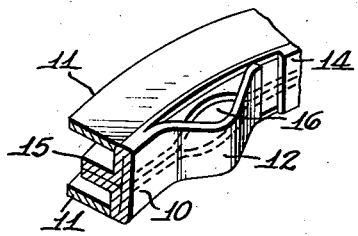
Figure 2 is a fragmentary perspective view on line 2—2, looking in the direction of the arrows, Figure 1.
Figure 3:
Figure 3 is a fragmentary view of the outer periphery of the packing shown in Figure 1.

Figure 2, a fragmentary perspective view of the inner periphery of the packing shown in Figure 1, more clearly shows the beading and the spring fingers, and Figure 3, a fragmentary view of the outer periphery of the packing, and more clearly shows the cells formed by crimping the arms. The band behind each cell is provided with slots 16, which in conjunction with openings in the band, due to forming the spring finger therein, provide free oil drainage between the wall of the cylinder and the drain ducts in the bottom of the groove in the piston. Another advantage of this packing and of the modified forms set forth herein, is the band tends to prevent the crimped arms of the spacer from expanding annularly and makes the spacer practically incompressible axially so that the piston rings maintain merely a working clearance within the groove and do not twist or reciprocate any more at high engine speeds than at lower speeds, thus eliminating a common fault of many forms of spacer rings which permit excessive oil leakage at high engine speeds.

Figure 4:
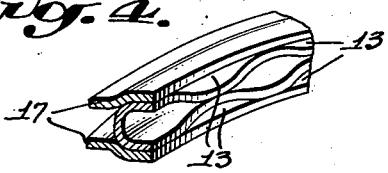
Figures 4, 5, 6 and 7 are fragmentary perspective views of modified forms of packings and spacer rings.
Figure 5:
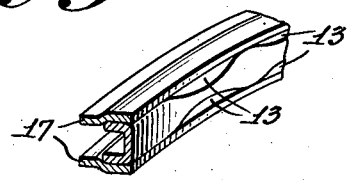
Figure 6:
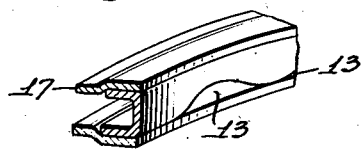
Figure 7:
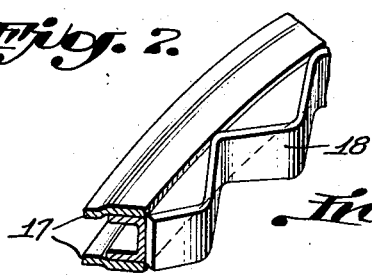

In Figures 4, 5, and 6, the piston rings 17 are formed and arranged to overlap the spacer ring axially so the radial pressure, if any, exerted by the spacer rings is transferred to the piston rings. Generally it would be desirable to construct the spacer ring of radially expansible material and of such shape that its radial expansibility plus that of the piston rings would be sufficient to maintain the desired cylinder wall sealing and scraping pressure without the use of an additional expander ring. However either or both the piston rings and the spacer ring can be made of non-expansible metal and depend entirely upon an additional expander ring for cylinder wall sealing and scraping pressure, as in these modifications, the spacer ring does not occupy any space between the packing and the bottom of the groove in the piston the packing can be used in a groove of conventional depth without regrooving same. One such arrangement is shown in Figure 7, wherein a ribbon type expander ring 18, is utilized to urge the packing against the wall of the cylinder. Also in these packings, both the arms and the annular band are corrugated so the grooves 13 of the corrugations extend from the outer periphery of the spacer ring to its inner periphery and provide free oil drainage between the wall of the cylinder and the drain ducts in the bottom of the groove in the piston, making the use of additional slots unnecessary under ordinary conditions. Under conditions where slots as well as drainage space provided by the grooves of the corrugations are necessary to provide sufficient drainage space the slots could be placed in the annular band contiguous to the cells with relatively little loss of radial expansibility, as shown in Figure 1, also the spacer ring can be provided with a beading for use in combination with rings not provided with means inwardly of its periphery for preventing a radially expansible spacer ring from seating on the wall of the cylinder. Another advantage of a beading when formed by doubling the edges of the band upon itself as shown in Figure 1, is it tends to increase the radial expansibility of the spacer ring.

I claim:

1. For use in a cylinder in combination with a reciprocating piston provided with a packing ring groove having upper and lower side walls, a packing comprising a pair of superposed rings arranged to seal said side walls and an interposed spacer ring of substantially U-shaped cross section and having radially extending arms, one at least of said arms being provided with radially extending corrugations formed and arranged to bear on the adjoining arm at annularly spaced intervals.

2. For use in a cylinder in combination with a reciprocating piston provided with a packing ring groove having upper and lower side walls, a packing including a pair of superposed piston rings arranged to seal said side walls and an interposed spacer ring of substantially U-shaped cross section and having radially extending arms, one at least of said arms being provided with corrugations extending from the outer to the inner periphery of the ring and adapted to bear on the adjoining arm at annularly spaced intervals.

3. In combination with a reciprocating piston provided with a packing ring groove having upper and lower side walls, a packing including a pair of superposed piston rings arranged to seal said side walls and a U-shaped spacer ring having upper and lower radially extending arms, said arms being crimped and formed and arranged to be in lateral contact with each other and the adjacent piston rings at annularly spaced intervals.

4. In combination with a reciprocating piston provided with a packing ring groove, a packing comprising a pair of superposed piston rings and an interposed spacer ring of U shaped cross section and having outwardly and radially extending arms, one at least of said arms being corrugated and adapted to bear on the adjoining arm at annularly spaced intervals and the inner peripheral edges of said ring being provided with axially extending beadings comprising its folded inner peripheral edges.

5. For use in a cylinder in combination with a reciprocating piston provided with a packing ring groove having upper and lower side walls, a packing comprising a pair of superposed piston rings arranged to seal said side walls and an interposed spacer ring comprising a substantially U shaped annular band having radially extending arms and provided with slots, one at least of said arms being corrugated and adapted to bear on the adjoining arm at annularly spaced intervals forming a series of annularly spaced cells, said slots forming radially extending openings in said ring and being disposed contiguous to said cells.

6. For use in a cylinder in combination with a reciprocating piston provided with a packing ring groove having upper and lower side walls, a packing comprising a pair of superposed piston rings arranged to seal said side walls and an interposed spacer ring of substantially U shaped cross section and having radially extending arms, one of said arms being corrugated and the grooves of said corrugations being formed in the outer axial face and the ridges in the inner axial face of said arm.

7. In combination with a reciprocating piston provided with a packing ring groove having upper and lower side walls, a packing comprising a pair of superposed piston rings arranged to seal said side walls and an interposed spacer ring comprising an annular band of U shaped cross section and having radially extending arms provided with corrugations, the grooves of said corrugations being formed in the outer axial faces and the ridges in the inner axial faces of said arms.

8. For use in a cylinder in combination with a reciprocating piston provided with a packing ring groove, a packing comprising a pair of superposed piston rings and an interposed spacer ring comprising an annular band provided with upper and lower radially extending arms and having its inner curved side provided with radially expansible spring fingers adapted to seat on the bottom of the groove in said piston and urge said piston rings against the wall of said cylinder, said arms being crimped and adapted to bear on the piston rings at annularly spaced intervals and to provide seats for said spring fingers.

WILLIAM S. MASON.